United States Patent

[11] 3,580,354

| [72] | Inventor | Harlan Douglas Hewitt<br>1210 Astor St., Chicago, Ill. 60610 |
| --- | --- | --- |
| [21] | Appl. No. | 814,216 |
| [22] | Filed | Jan. 21, 1969 |
| [45] | Patented | May 25, 1971<br>Continuation-in-part of application Ser. No. 665,056, Sept. 1, 1967, now abandoned. |

[54] VEHICLE TILT COMPENSATOR
6 Claims, 3 Drawing Figs.

[52] U.S. Cl. .................................................... 180/104,
280/150
[51] Int. Cl. ........................................................ B60r 21/00
[50] Field of Search........................................... 180/82,
103, 104, 1, 118; 244/1, 1 (SS), 3.22; 89/1;
280/150 (D)

[56] References Cited
UNITED STATES PATENTS

| 3,023,980 | 3/1962 | Martin | 244/4 |
| --- | --- | --- | --- |
| 3,088,406 | 5/1963 | Horner | 244/3.22X |
| 3,091,084 | 5/1963 | Eckhardt | 244/3.22X |
| 3,259,202 | 7/1966 | Griffeth | 180/104 |
| 3,373,836 | 3/1968 | Chaplin | 180/118 |

FOREIGN PATENTS

| 526,433 | 6/1956 | Great Britain | 180/1 |
| --- | --- | --- | --- |

*Primary Examiner*—Kenneth H. Betts
*Attorney*—Anderson, Luedeka, Fitch, Even and Tabin ABSTRACT: The following abstract is provided in accordance with Rule 72(b) and only for the purpose set forth therein.

In the present invention, apparatus is provided for use in combination with a vehicle to prevent the vehicle from overturning or to delay the overturning action long enough to allow the driver to leave the vehicle safely. The apparatus includes thrust producing means activated when the vehicle is inclined beyond the critical balance angle of the vehicle, or when the vehicle reaches some predetermined position in relation to the critical balance angle. The thrust produced is used to return the vehicle toward its normal upright position.

PATENTED MAY 25 1971 3,580,354

Inventor
Harlan Douglas Hewitt

Anderson, Luedeka, Fitch, Even, & Tabin
Attorneys

VEHICLE TILT COMPENSATOR

This application is a continuation-in-part of application Ser. No. 665,056 filed Sept. 1, 1967 (now abandoned). The present invention relates generally to apparatus for use with wheeled and continuous track vehicles, and more particularly relates to apparatus for use in preventing or delaying inadvertent tipping of such vehicles beyond a predetermined point.

All vehicles are subject to tipping or rollover problems when the vehicles are operated over rough terrain or when some obstacle is presented in their path which changes their inclination from horizontal. This is particularly true of vehicles which are operated in off-the-road situations, such as farm tractors, general utility tractors, four-wheeled drive vehicles, construction vehicles, track laying vehicles, industrial tractors and equipment, and self-propelled military and farm equipment.

Various devices have been proposed for protecting the occupants of such vehicles in the event that an accidental or inadvertent tipping of the vehicle occurs. Such devices include what are commonly known as rollover bars, customarily used with seat belts, shielded cockpits, or other devices which are intended to protect the occupants if the vehicle overturns. However, such prior art protective devices have certain limitations on older tractors and on tractors using certain mounted equipment, and in relation to cost and strength factors for units of large size. Furthermore, they do not eliminate the problem where the vehicle overturns in extremely soft earth or other terrain where it is possible for the occupant of the vehicle to be trapped and embedded in the soft soil or to drown in a relatively shallow level of water or to be injured by stumps, rocks or other terrain features which project past the roll-bar to strike the driver who is constrained in place by the seat belt at the time of the overturn.

It would therefore be desirable to provide apparatus and means for preventing or delaying the overturn of vehicles, and therefore alleviate the safety hazard to the occupants of the vehicles from such inadvertent turnover. The frequency of accidents involving serious injury or fatality for drivers of heavy-duty vehicles has made the provision of such safety apparatus of increasingly great concern to the manufacturers of heavy-duty vehicles such as farm tractors.

Accordingly, it is an object of the present invention to provide apparatus for preventing or appreciably delaying the rollover of vehicles. It is another object of the present invention to prevent tipping of vehicles beyond a predetermined level of inclination. It is a further object of the present invention to provide apparatus for increasing the traction of a vehicle and to maintain the vehicle in a relatively stable condition at least long enough to allow the driver time to jump off the vehicle before an overturn can take place. It is a further object of the present invention to disconnect the motor ignition system and the power train, thus ending the forward implementation of the vehicle. It is a still further object of the invention to provide an apparatus in combination with a driver and a vehicle to prevent the vehicle from inadvertently rolling over or to delay an overturn sufficiently to allow the driver time to remove himself from danger.

These and other objects of the present invention will become more clear from the following detailed description and the drawings wherein.

Figure 1:
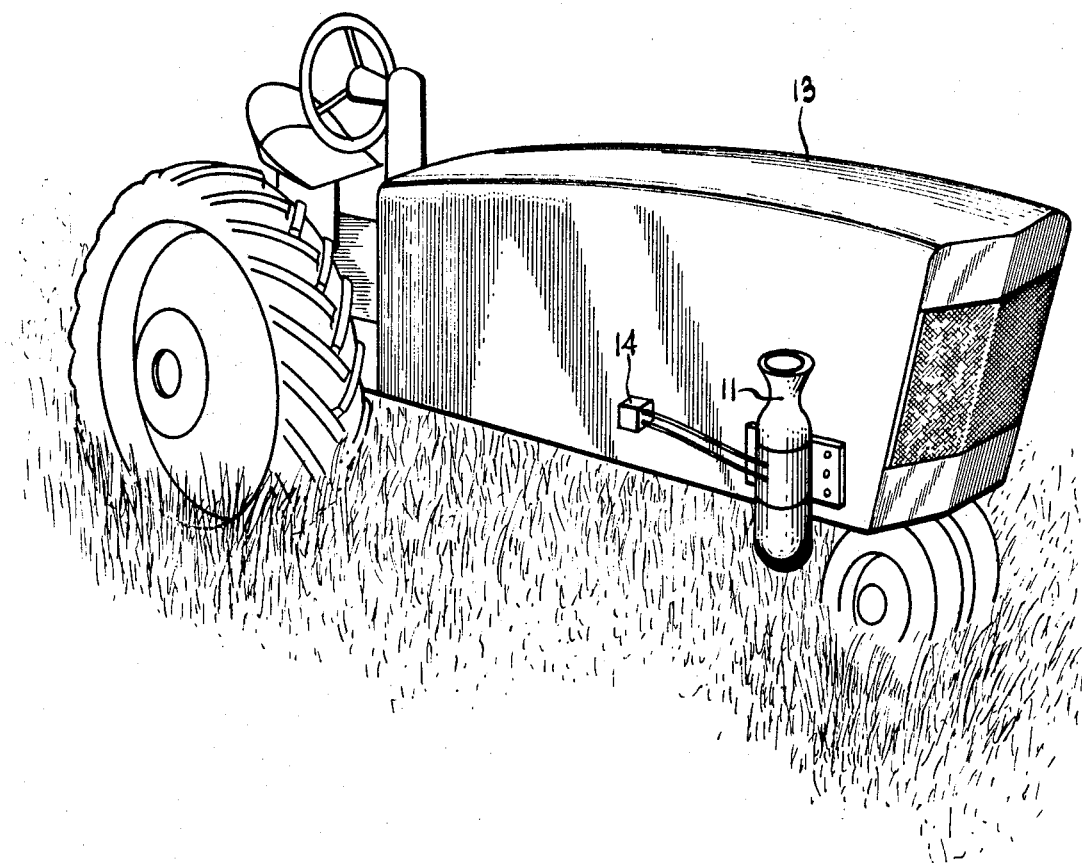
FIG. 1 is a pictorial representation of a vehicle with apparatus of the present invention installed.
Figure 2:
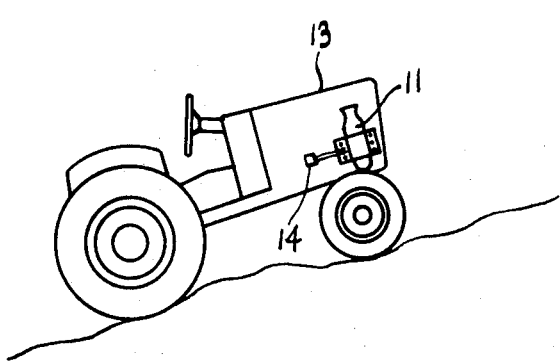
FIG. 2 is a schematic view of a vehicle with apparatus of the present invention installed and operating to prevent endwards overturning.
Figure 3:
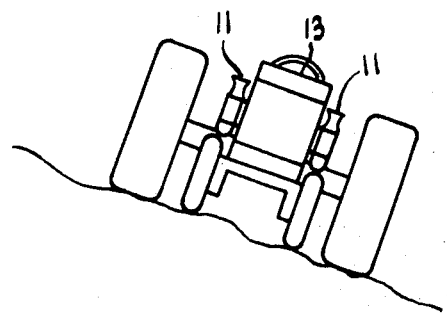
FIG. 3 is a schematic view of a vehicle with apparatus of the present invention installed and operating to prevent sidewards overturning.

In general, as seen in FIG. 1, in apparatus embodying various of the features of the present invention, thrust producing means 11 are provided in cooperation with a vehicle 13 so as to provide a counteracting force when the vehicle is inclined at a predetermined amount from a horizontal position or at a degree to threaten the hazard of a vehicle overturn. Such counteracting force is maintained for at least a time sufficient for the operator of the vehicle to escape from the vehicle. Sensing means 14 are provided which detect the degree of inclination of the vehicle and which are adapted to provide a signal which energizes the thrust-producing means when a counteracting force is required. Upon being energized, the thrust-producing means 13 generates an upwardly directed stream of gas which results in a downward thrust against the vehicle 13. The apparatus may be adapted for use with any vehicle; the apparatus however is particularly suited for use with vehicles which are operated in off-the-road situations, such as farm tractors, general utility tractors, four-wheeled drive vehicles, construction vehicles, tract laying vehicles, industrial tractors and equipment, and self-propelled military and farm equipment.

Any suitable thrust-producing means may be used in the practice of the present invention. A particularly suitable thrust-producing means are propellants which are adapted for use in a rocket engine and which may be rapidly ignited. In this connection, it is desirable to effect ignition of the fuel within a period of fractions of a second. As used herein, a propellant is defined as a combustible substance that supplies ejection gases producing a thrust force in the direction opposite the direction of movement of the ejected gases in quantity sufficient to achieve the purposes of this invention.

In general, to obtain the maximum thrust for a given amount of solid rocket fuel, it is desirable to provide the fuel in a cylindrical disposition within a suitable casing. The exposed surfaces of the rocket fuel may then be packed with a suitable priming material for rapid activation of the fuel. The particular method of loading the solid rocket fuel within a suitable casing and of distributing the primer within the solid fuel so as to effect rapid ignition of the fuel when desired is well known in the art. The propellant may also be a fluid rocket fuel, although solid propellants are preferred because of the relative simplicity of storage, ignition, etc.

The thrust-producing means of the present invention may also be a compressed gas which generates thrust by discharge of the compressed gas. For example, a cylinder or bottle of compressed gas may be mounted on the vehicle 13 as illustrated in FIG. 1 with a port at its upper end which may be opened to release the contained gases. Gases and propellants may be also used jointly in combination as, for instance, when a propellant might supply the high initial thrust and gases be used to maintain continued stability.

A plurality of thrust-producing means may be distributed in various positions on the vehicle to compensate for any type of undesired tipping of the vehicle. For example, thrust-producing means may be located both sides and on the forward and rearward ends of the vehicle to prevent both tipping in a sidewards direction and tipping in a forward or rearward direction. The sensing means, to be described hereinafter, may activate more than one of the plurality of thrust-producing means to provide for a combination force effect. Corrective apparatus when placed forward of the driver is directed slightly forward away from the driver and when placed behind the driver is tilted slightly rearward so that under no predictable circumstance will the ejected gases injure the driver.

The sensing means may be any suitable device which is adapted to detect inclination and transmit a suitable signal to the thrust-producing means. Such sensing means are well known to persons skilled in the art and therefore are not specifically illustrated here. For example, the sensing means may be a mercury switch in which two electrodes are provided in combination with a pool of mercury. When the switch is tilted to a preselected angle, the mercury contacts both electrodes and thereby provides means for closing an electrical circuit between the electrodes. The electrodes may, for example, be connected to the ignition coil or magneto of the vehicle and to the thrust-producing means respectively, and when the mercury switch reaches the preselected inclination and the circuit is thereby closed a high voltage signal is applied to the thrust-producing means to thereby energize it.

Other suitable devices which measure inclination may also be used, although the mercury switch just described is probably the least complex. These devices include pendulum devices and gyroscopes, such as are used to determine attitude in submarines, or the artificial horizon and turn-and-bank indicators of airplanes. When a plurality of thrust-producing means are utilized, a plurality of sensing means will also usually be required, to sense inclination in the direction each thrust-producing means in positioned to counteract. This enables the thrust-producing means to prevent turnover of the vehicle in a variety of terrain situations. The sensing means should, of course, be suitably damped to avoid producing a false signal upon rapid acceleration or deceleration of the vehicle.

The signal provided by the sensing means to the thrust-producing means should result in prompt energization of the latter. If the circuit described above is utilized in which a high voltage signal from the ignition system is supplied to the thrust-producing means, the high voltage signal may itself energize the thrust-producing means, as by igniting the primer of the rocket propellant or, in the case of the compressed gas thrust-producing means by triggering an explosive bolt which thereby permits opening of the port.

An override switch may be incorporated into the signal circuits to prevent accidental ignition of propellant or accidental discharge of compressed gas. Such an override switch may be located immediately in front of the driver and may comprise a rod or bar connected to a switch which opens or closes the circuit from the vehicle ignition system to the sensing means. In the open position, the sensing means is deprived of a signal to energize the thrust-producing means. The override switch should, however, be in a position such that the operator can rapidly throw the switch closed, as by a downward movement of the hand or hands from the steering wheel.

In some situations it is conceivable that the thrust-producing means be separately energized manually. For example, manual control could be used to activate a thrust-producing means located near the drive wheels of a vehicle to provide a downward force on the drive wheels, when desired, so as to increase the traction of the wheels. Such increased traction would be desirable for certain emergency situations. The thrust-producing means would be energized by a circuit independent of the sensing means so that it may be intentionally activated by the driver. Thrust-producing means may also be located at an angle such that when the thrust-producing means is intentionally activated by the driver the force generated aids in moving the vehicle in a desired direction.

Any time required for energization of particular thrust-producing means can be compensated for by setting the sensing means to energize the thrust-producing means an appropriate period of time before the vehicle reaches its critical balance angle. Such lead time can readily be determined by one skilled in the art once a particular vehicle is specified and once the thrust-producing means has been decided upon. It should be noted that the present state of the art of solid fuel rocketry makes maximum thrust available in approximately 80 milliseconds from the time ignition sequence is begun. The fuel, which burns on its available surface, can be shaped to supply an extremely high initial thrust for a fraction of a second, tapering to thrusts of varying lesser values as needed. In this way the correcting forces can be scheduled in such a way as to maximize the forces available at the start when they are needed to compensate for the momentum of the overturning forces and yet, by being quickly reduced in scale, to minimize hazards of over compensation.

The total thrust required from the thrust-producing means is related directly to the angle of thrust at the time the activation is effected, the weight of the vehicle, the axis against which the force is to be applied, the leverage resulting from the distance between the force and the axis against which it is to be applied, the center of gravity of the vehicle, and the critical balance angle of the vehicle in relation to the particular terrain.

The correct placement of the thrust in relation to the design of any particular vehicle will obviate the hazard of over-compensation to the point where the vehicle might be tipped over in the direction opposite that of the original tipping. Such correct placement will vary from one vehicle design to another and will be determined in relation to the particular design features of the vehicle upon which the device is to be installed.

The sensing means may also be utilized to energize other safety elements as, for example, warning lights, etc., although it should be understood that energization of the thrust-producing means will result in production of intense sound which will itself provide warning to the driver to take appropriate action. Similarly, the signal may be used to disconnect the motor ignition system or to disconnect the power train of the vehicle, as by energizing an explosive bolt in the drive shaft, opening a valve to deactivate a fluid transmission circuit, etc. Such refinements may be utilized either alone or in combination with thrust-producing means.

It can readily be seen by one skilled in the art that the apparatus of the present invention is readily adapted to numerous modifications of detail and methods of application.

Various features of the present invention are set forth in the following claims.

I claim:

1. Apparatus for preventing or delaying overturn of a wheeled vehicle to permit the driver to leave the vehicle safely comprising, in combination, thrust-producing means disposed on said vehicle in a position to counteract overturning in one or more directions by generating an upwardly directed stream of gas which results in a downward thrust against the vehicle, and sensing means adapted to detect the degree of inclination of said vehicle and transmit a signal to said thrust-producing means when the vehicle attains a preselected inclination to thereby energize said thrust-producing means.

2. Apparatus in accordance with claim 1 wherein said thrust-producing means is a rocket propellant.

3. Apparatus in accordance with claim 1 wherein said thrust-producing means comprises compressed gas.

4. Apparatus in accordance with claim 2 wherein said propellant is a solid.

5. Apparatus in accordance with claim 1 wherein said sensing means comprises a mercury switch.

6. Apparatus in accordance with claim 1 wherein energization of said thrust-producing means produces an audible warning to the driver that the vehicle has attained a preselected inclination.

UNITED STATES PATENT OFFICE
CERTIFICATE OF CORRECTION

Patent No. 3,580,354　　　　　　　　　　Dated May 25, 1971

Inventor(s) Harlan Douglas Hewitt

It is certified that error appears in the above-identified patent and that said Letters Patent are hereby corrected as shown below:

On the cover sheet [56] "Great Britain" should read -- Canada --. Column 1, lines 45 and 46, "rol-lover" should read -- roll-over --.

Signed and sealed this 7th day of December 1971.

(SEAL)
Attest:

EDWARD M. FLETCHER, JR.　　　　　　ROBERT GOTTSCHALK
Attesting Officer　　　　　　　　　　Acting Commissioner of Patents